(12) United States Patent
Mizutani et al.

(10) Patent No.: US 9,841,545 B2
(45) Date of Patent: Dec. 12, 2017

(54) OPTICAL FILM WITH PRESSURE SENSITIVE ADHESIVE ON BOTH SIDES AND METHOD FOR PRODUCING IMAGE DISPLAY DEVICE USING THEREOF, AND METHOD FOR SUPPRESSING CURL OF OPTICAL FILM WITH PRESSURE SENSITIVE ADHESIVE ON BOTH SIDES

(71) Applicant: NITTO DENKO CORPORATION, Ibaraki-shi, Osaka (JP)

(72) Inventors: Masaki Mizutani, Ibaraki (JP); Shou Takarada, Ibaraki (JP); Atsushi Yasui, Ibaraki (JP)

(73) Assignee: NITTO DENKO CORPORATION, Ibaraki-shi, Osaka (JP)

(*) Notice: Subject to any disclaimer, the term of this patent is extended or adjusted under 35 U.S.C. 154(b) by 153 days.

(21) Appl. No.: 14/876,946

(22) Filed: Oct. 7, 2015

(65) Prior Publication Data
US 2016/0109631 A1    Apr. 21, 2016

(30) Foreign Application Priority Data
Oct. 15, 2014  (JP) .................................. 2014-211249

(51) Int. Cl.
*B32B 7/12*   (2006.01)
*G02B 5/30*   (2006.01)
*C09J 7/02*   (2006.01)

(52) U.S. Cl.
CPC .......... *G02B 5/3033* (2013.01); *C09J 7/0207* (2013.01); *C09J 7/0235* (2013.01); *C09J 2201/134* (2013.01); *C09J 2201/622* (2013.01); *C09J 2203/318* (2013.01); *C09J 2467/006* (2013.01)

(58) Field of Classification Search
CPC ................ C09J 7/0207; C09J 2201/134; C09J 2201/622
See application file for complete search history.

(56) References Cited

U.S. PATENT DOCUMENTS

2010/0209703 A1    8/2010  Takarada et al.

FOREIGN PATENT DOCUMENTS

| JP | 2010-189545 A | 9/2010 |
| JP | 2011-074308 A | 4/2011 |
| JP | 2014-115468 A | 6/2014 |

*Primary Examiner* — Victor Chang
(74) *Attorney, Agent, or Firm* — Sughrue Mion, PLLC (57) ABSTRACT

The optical film with a pressure sensitive adhesive on both sides includes a first pressure sensitive adhesive layer having a thickness of 3 μm to 30 μm on first main surface of an optical film, and a second pressure sensitive adhesive layer having a thickness of 50 μm or more on second main surface of the optical film. A first protective sheet and a second protective sheet are releasably attached on the first pressure sensitive adhesive layer and the second pressure sensitive adhesive layer, respectively. The residual stress of the second pressure sensitive adhesive layer $S_2$ (N/cm$^2$), the thickness of the first protective sheet Y (μm); and the thickness of the second protective sheet Z (μm) satisfy the following relationship: $20 \leq Y \leq 80$; $45 \leq Z$; and $Y + 0.17\ Z + 10.6\ S_2 \geq 63$.

8 Claims, 3 Drawing Sheets

OPTICAL FILM WITH PRESSURE SENSITIVE ADHESIVE ON BOTH SIDES AND METHOD FOR PRODUCING IMAGE DISPLAY DEVICE USING THEREOF, AND METHOD FOR SUPPRESSING CURL OF OPTICAL FILM WITH PRESSURE SENSITIVE ADHESIVE ON BOTH SIDES

TECHNICAL FIELD

The present invention relates to an optical film with a pressure sensitive adhesive, which is used for formation of an image display device including a transparent plate or a touch panel on the front surface of an image display panel. Further, the present invention relates to a method for producing an image display device using the optical film with a pressure sensitive adhesive.

BACKGROUND ART

Liquid crystal displays and organic EL displays are widely used as various kinds of image display devices of mobile phones, car navigation devices, personal computer monitors, televisions and so on. In the liquid crystal display device, a polarizing plate is disposed on a viewing side surface of an image display cell in accordance with the display principle of the liquid crystal display device. In the organic EL display device, a circularly polarizing plate (a laminate of a polarizing plate and a quarter wave plate) may be disposed on a viewing side surface of an image display cell for inhibiting external light reflection at a metal electrode (cathode) from being viewed like a mirror surface.

In a general image display device, a polarizing plate is disposed on the outermost surface of an image display panel (a liquid crystal panel or an organic EL panel). On the other hand, a front transparent plate (also referred to as a "window layer" etc.) such as a transparent resin plate or a glass plate may be provided on a viewing side of an image display panel for the purpose of, for example, preventing damage to the image display panel due to impact from the outer surface. In a display device including a touch panel, generally the touch panel is disposed on a viewing side of an image display panel (hereinafter, the front transparent plate and the touch panel may be referred to together as a "front transparent member").

For arranging a front transparent member such as a front transparent plate or a touch panel on a viewing side of an image display panel, an "interlayer filling structure" is employed in which the front transparent member and the image display panel are bonded with a pressure sensitive adhesive layer therebetween. In the interlayer filling structure, a gap between the panel and the front transparent member is filled with a pressure sensitive adhesive to decrease a refractive index difference at the interface, and therefore deterioration of visibility due to reflection and scattering is suppressed. There has been proposed a film with a pressure sensitive adhesive on both sides, which includes an optical film such as a polarizing plate, one surface of which is provided with a pressure sensitive adhesive layer for bonding the film to an image display panel and the other surface of which is provided with an interlayer filling pressure sensitive adhesive for bonding the film to a front transparent member (e.g., JP-A-2014-115468).

A colored layer (decorative printed layer) intended for decoration and light shielding is formed on the peripheral edge of a surface of the front transparent member on the panel side. When the decorative printed layer is formed on the peripheral edge of the transparent plate, a printing level difference of about 10 μm to several tens μm is generated. When a sheet pressure sensitive adhesive is used as an interlayer filler, bubbles are easily generated on the periphery of the printing level difference portion. Display unevenness may occur at the peripheral edge of a screen because local stress is added to the image display panel immediately below the printing level difference portion through the pressure sensitive adhesive, so that the end of the screen is dynamically distorted.

For solving problems caused by a printing level difference of a front transparent member as described above, a soft and thick pressure sensitive adhesive sheet is used for bonding the front transparent plate, so that level difference absorbency is imparted. For example, JP-A-2014-115468, JP-A-2011-74308 and JP-A-2010-189545 describe that the storage elastic modulus and residual stress of an interlayer filling pressure sensitive adhesive layer to be used for bonding an optical film and a front transparent member are each made to fall within a specific range.

SUMMARY OF THE INVENTION

Problems to be Solved by the Invention

Figure 3A:
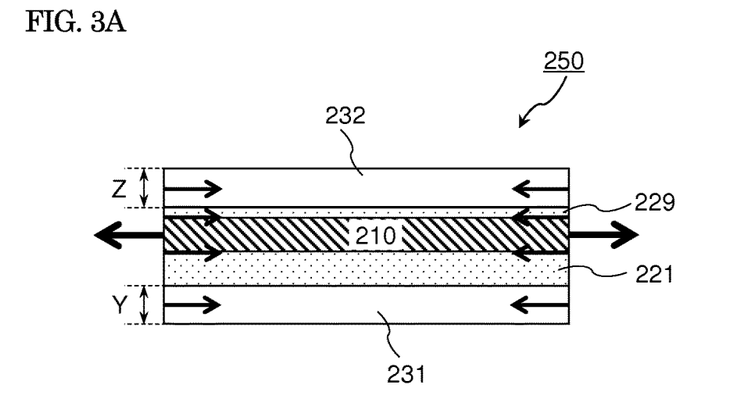
Figure 3B:
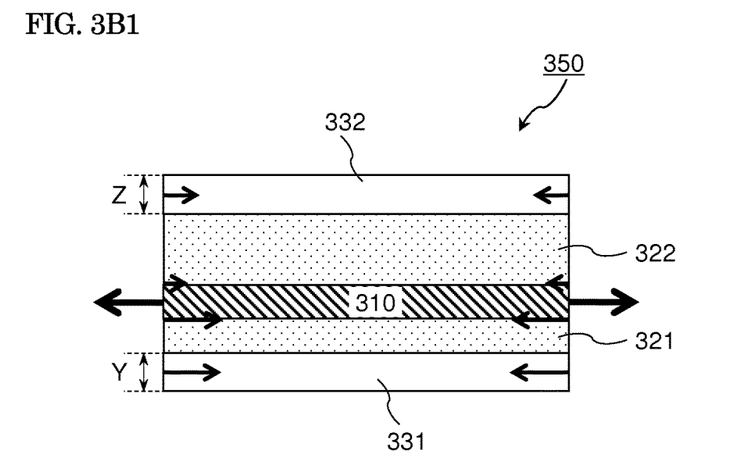
Figure 3B:
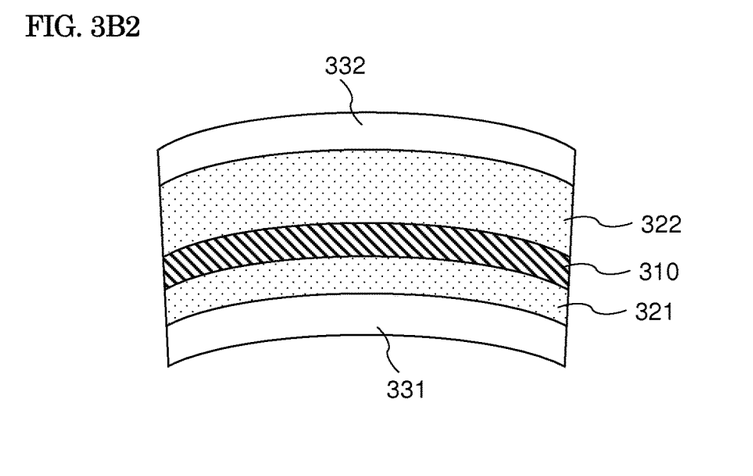

The optical film with a pressure sensitive adhesive has a protective sheet temporarily attached on the surface for preventing deposition of foreign matters on the surface of a pressure sensitive adhesive layer, transference of a pressure sensitive adhesive, and so on, until the optical film is bonded to an adherend such as an image display cell or a front transparent member. As a result of studies conducted by the present inventors, it has been found that when exposed to a high-humidity environment in a storage state, an optical film with a pressure sensitive adhesive on both sides, which includes a soft and thick adhesive as an interlayer filling pressure sensitive adhesive for bonding the optical film to a front transparent member, is easily curled such that a surface to be bonded to the front transparent member (surface on the pressure sensitive adhesive layer 322 side) is convexed as schematically shown in FIG. 3B2.

When curl occurs such that a surface on the pressure sensitive adhesive layer 322 side is convexed, workability is deteriorated at the time of bonding an optical film 310 and an image display cell to each other with a pressure sensitive adhesive layer 321 interposed therebetween. In view of these problems, an object of the present invention is to provide an optical film with a pressure sensitive adhesive on both sides, which includes a soft and thick pressure sensitive adhesive layer for bonding the optical film to a front transparent member such as a touch panel or a front transparent plate and which is inhibited from being curled.

Means for Solving the Problems

As a result of extensively conducting studies in view of the above-mentioned problems, it has been found that when the thickness of a protective sheet to be temporarily attached on each of pressure sensitive adhesive layers on both sides is adjusted to fall within a specific range depending on properties of an interlayer filling pressure sensitive adhesive on the front transparent member side, occurrence of curl is suppressed even if an optical film with a pressure sensitive adhesive on both sides is exposed to a high-humidity environment.

The present invention relates to an optical film with a pressure sensitive adhesive on both sides which is to be disposed between a front transparent plate or a touch panel and an image display cell. The optical film with a pressure sensitive adhesive on both sides includes a first pressure sensitive adhesive layer provided on first main surface of an optical film, and a second pressure sensitive adhesive layer on second main surface of the optical film. The optical film includes a polarizing plate. The first main surface is configured to be bonded to an image display cell, and the second main surface is configured to be bonded to a transparent plate or a touch panel. First protective sheet and second protective sheet are releasably attached respectively on the first pressure sensitive adhesive layer and the second pressure sensitive adhesive layer. The first pressure sensitive adhesive layer has a thickness of 3 µm to 30 µm, and a storage elastic modulus of 0.02 MPa to 2 MPa at a temperature of 23° C. The second pressure sensitive adhesive layer has a thickness of 50 µm or more.

In the optical film with a pressure sensitive adhesive on both sides according to the present invention, a residual stress of the second pressure sensitive adhesive layer $S_2$ (N/cm$^2$), the thickness of the first protective sheet Y (µm); and the thickness of the second protective sheet Z (µm) satisfy the following relationship:

$20 \leq Y \leq 80$;

$45 \leq Z$; and $Y + 0.17Z + 10.6S_2 \geq 63$.

Herein, the residual stress is a tensile stress as measured by a tensile stress relaxation test under the conditions of a temperature of 23° C., a strain of 300%, and a relaxation time of 180 seconds.

Each of a tensile elastic modulus of the first protective sheet and a tensile elastic modulus of the second protective sheet is preferably 1 GPa to 6 GPa. A biaxially stretched polyester film is preferably used for each of the first protective sheet and the second protective sheet. It is preferred that the thickness Z of the second protective sheet is larger than the thickness Y of the first protective sheet.

An optical film with a pressure sensitive adhesive on both sides according to the present invention includes a first pressure sensitive adhesive layer for bonding the optical film to an image display cell, and a second pressure sensitive adhesive layer for bonding the optical film to a front transparent member such as a front transparent plate or a touch panel. According to this configuration, it is not necessary to provide an extra liquid adhesive or pressure sensitive adhesive sheet at the time when the image display panel and the front transparent member are bonded to each other to form an interlayer filling structure, and thus the production process is simplified.

When the residual stress $S_2$ of the second pressure sensitive adhesive layer falls within the above mentioned a specific range, bubbles in the vicinity of the decorative printed portion provided on the peripheral edge of the front transparent member are suppressed, and protrusion of the pressure sensitive adhesive from the end surface of the film is also suppressed. Further, when the residual stress $S_2$ of the second pressure sensitive adhesive layer, and the thickness Y of the first protective sheet and the thickness Z of the second protective sheet satisfy the above mentioned relationship, occurrence of curl resulting from absorption of moisture under a high-humidity environment, etc. is suppressed. Accordingly, workability in bonding of the film to an image display cell or the like is improved, so that the productivity and yield of image display devices can be improved.

The present invention also relates to a method for producing an image display device using the optical film with a pressure sensitive adhesive on both sides. In the image display device, an optical film including a polarizing plate is disposed on an image display cell with a first pressure sensitive adhesive layer interposed therebetween, and a front transparent plate or a touch panel is disposed on the polarizing plate with a second pressure sensitive adhesive layer interposed therebetween.

The method for producing an image display device according to the present invention includes the following steps:

(1) First bonding step: peeling off a protective sheet attached on the first pressure sensitive adhesive layer of the optical film with a pressure sensitive adhesive on both sides, and then bonding the optical film and the image display cell to each other with the first pressure sensitive adhesive layer interposed therebetween; and (2) Second bonding step: peeling off a protective sheet attached on the second pressure sensitive adhesive layer, and then bonding the optical film and the front transparent plate or the touch panel to each other with the second pressure sensitive adhesive layer interposed therebetween.

Order of the first bonding step and the second bonding step is not limited. The first bonding step and the second bonding step may be performed in parallel.

When the pressure sensitive adhesive that forms the second pressure sensitive adhesive layer is a photocurable pressure sensitive adhesive containing a photocurable component, it is preferred that after the second bonding step, an active ray is applied from the front transparent plate or touch panel to cure the second pressure sensitive adhesive.

BRIEF DESCRIPTION OF THE DRAWINGS

FIGS. 3A and 3B1 are diagrams each explanatorily showing probable stresses caused in an optical film with a pressure sensitive adhesive; and FIG. 3B2 is a schematic view of an optical film with a pressure sensitive adhesive on both sides with occurrence of curl due to probable stresses as shown in FIG. 3B1.

DESCRIPTION OF EMBODIMENTS

Figure 1:
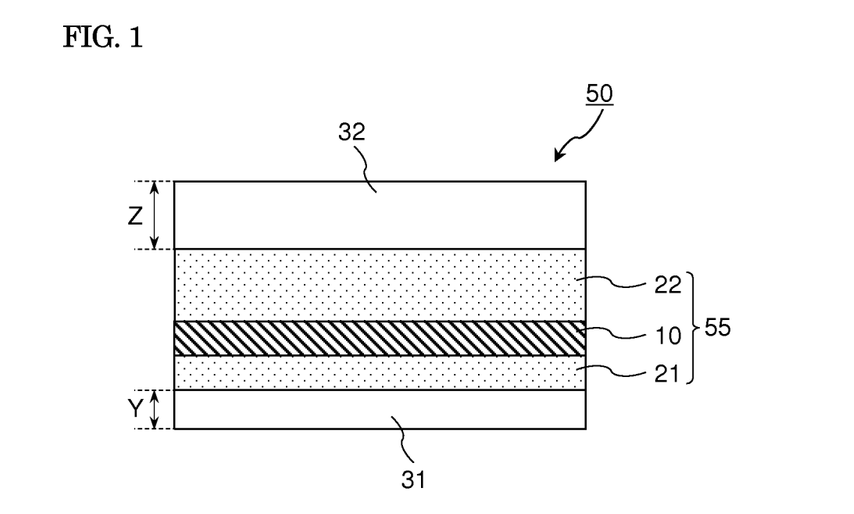
FIG. 1 is a sectional view schematically showing one embodiment of an optical film with a pressure sensitive adhesive on both sides.

FIG. 1 is a sectional view schematically showing a stacking structure of an optical film with a pressure sensitive adhesive on both sides according to one embodiment of the present invention. The optical film with a pressure sensitive adhesive on both sides 55 includes a first pressure sensitive adhesive layer 21 on one surface (first main surface) of the optical film 10, and a second pressure sensitive adhesive layer 22 on the other surface (second main surface). A first protective sheet 31 is releasably attached on the first pressure sensitive adhesive layer 21, and a second protective sheet 32 is releasably attached on the second pressure sensitive adhesive layer 22.

Figure 2:
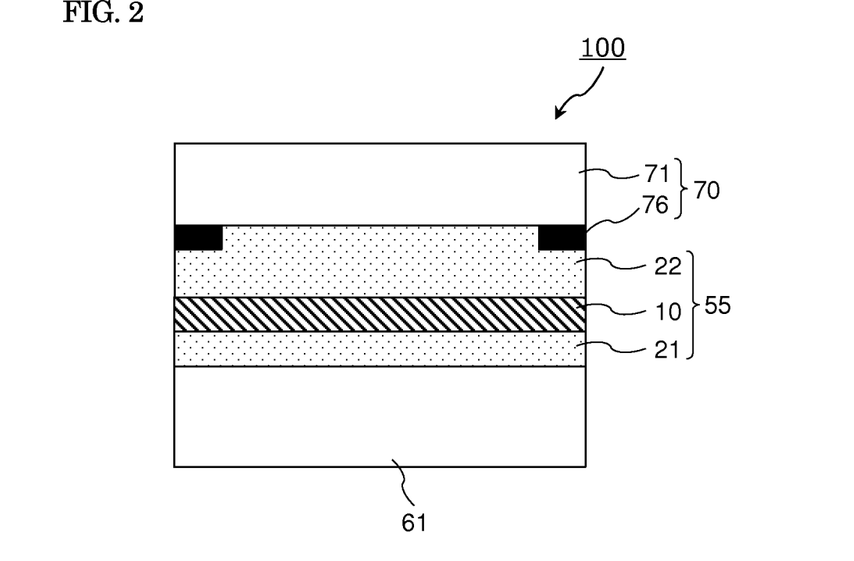
FIG. 2 is a sectional view schematically showing one embodiment of an image display device.

FIG. 2 is a sectional view schematically showing one embodiment of an image display device 100 according to the present invention. In the image display device 100 shown in FIG. 2, one surface of the optical film 10 is bonded to an image display cell 61 with the first pressure sensitive adhesive layer 21 interposed therebetween, and the other surface of the optical film 10 is bonded to a front transparent member 70 with the second pressure sensitive adhesive layer 22 interposed therebetween.

[Optical Film]

The optical film 10 includes a polarizing plate. As the polarizing plate, one having an appropriate transparent protective film laminated on one surface or both surfaces of a polarizer as necessary is generally used. The polarizer is not particularly limited, and various kinds of polarizers may be used. Examples of the polarizer include films obtained by impregnating a dichroic material such as iodine or a dichroic dye into a hydrophilic polymer film such as a polyvinyl alcohol-based film, a partially formalized polyvinyl alcohol-based film or an ethylene-vinyl acetate copolymer-based partially saponified film, and uniaxially stretching the film; and polyene-based oriented films such as those of dehydrated products of polyvinyl alcohol and dehydrochlorinated products of polyvinyl chloride.

For the transparent protective film as a protective film for the polarizer, a resin excellent in transparency, mechanical strength, thermal stability, moisture barrier property and optical isotropy, such as a cellulose-based resin, a cyclic polyolefin-based resin, an acryl-based resin, a phenylmaleimide-based resin or a polycarbonate-based resin, is preferably used. When a transparent protective film is provided on each of both surfaces of the polarizer, protective films formed of the same polymer material may be used or protective films formed of different polymer materials may be used on the front surface and the back surface. For the purpose of, for example, optical compensation and wide viewing of a liquid crystal cell, an optically anisotropic film such as a retardation sheet (stretched film) can also be used as a protective film for the polarizer.

The optical film 10 may be consisting of the polarizing plate. The optical film 10 may include other films laminated on one surface or both surfaces of the polarizing plate with an appropriate adhesive layer or a pressure sensitive adhesive layer interposed therebetween as necessary. The type of the films laminated on the polarizing plate is not particularly limited. Films generally used for formation of an image display device, such as retardation sheets, wide-viewing films, viewing angle restriction (peep prevention) films and brightness enhancement films may be laminated on the polarizing plate. For example, in the liquid crystal display device, an optical compensation film may be arranged between the image display cell (liquid crystal cell) and the polarizing plate for the purpose of, for example, improving viewing angle properties by appropriately changing the polarized state of light emitted from the liquid crystal cell to the viewing side. In the organic EL display device, a quarter wave plate may be arranged between the cell and the polarizing plate for the purpose of inhibiting external light from being reflected at a metal electrode layer to cause the surface to be viewed like a mirror surface. When a quarter wave plate is arranged on a viewing side of the polarizing plate, linearly polarized light emitted from the polarizing plate is converted into circularly polarized light, so that a proper displayed image can be made visible even to a viewer wearing polarizing sunglasses.

A surface of the optical film 10 may be provided with a hard coat layer, or subjected to an antireflection treatment, or a treatment intended for prevention of sticking, diffusion or antiglare. A surface of the optical film 10 may be subjected to a surface modification treatment for the purpose of, for example, improving adhesiveness before the pressure sensitive adhesive layers 21 and 22 are provided thereon. Specific examples of the treatment include a corona treatment, a plasma treatment, a flame treatment, an ozone treatment, a primer treatment, a glow treatment, a saponification treatment, and a treatment with a coupling agent. An antistatic layer may also be formed.

[First Pressure Sensitive Adhesive Layer]

The first pressure sensitive adhesive layer 21 is provided on first main surface of the optical film 10. In formation of an image display device, the first pressure sensitive adhesive is used for bonding the optical film 10 to the image display cell 61. For the first pressure sensitive adhesive layer, a pressure sensitive adhesive excellent in optical transparency is preferably used because it is used in an image display device. Specifically, it is preferred that the first pressure sensitive adhesive layer 21 has a haze of 1.0% or less, and a total light transmittance of 90% or more. It is preferred that the second pressure sensitive adhesive layer 22 described later also has a haze of 1.0% or less, and a total light transmittance of 90% or more.

The thickness of the first pressure sensitive adhesive layer 21 is preferably 3 μm to 30 μm, more preferably 5 μm to 27 μm, further preferably 10 μm to 25 μm. The storage elastic modulus of the first pressure sensitive adhesive layer 21 at a temperature of 23° C. is preferably 0.02 MPa to 2 MPa, more preferably 0.05 MPa to 1.5 MPa, further preferably 0.07 MPa to 1 MPa.

When the first pressure sensitive adhesive layer has a thickness and storage elastic modulus as described above, the pressure sensitive adhesive layer is excellent in durability, and defects such as ingress of bubbles at the time of bonding the optical film to an image display cell can be suppressed. When the thickness and elastic modulus of the first pressure sensitive adhesive layer fall within the above-mentioned range, stress at the interface between the first protective sheet 31 and the pressure sensitive adhesive layer 21 can be propagated to the interface between the pressure sensitive adhesive layer 21 and the optical film 10 as elastic strain stress of the pressure sensitive adhesive layer 21. Accordingly, even if the optical film 10 causes a dimensional change due to hygroscopic expansion etc., occurrence of curl can be suppressed by the bearing force of the first protective sheet.

The first pressure sensitive adhesive layer 21 preferably has a residual stress $S_1$ of 1 N/cm² to 50 N/cm² as measured by a tensile stress relaxation test under the conditions of a temperature of 23° C., a strain of 300%, and a relaxation time of 180 seconds (hereinafter, the residual stress after 180 seconds relaxation as measured in this manner may be referred to simply as "residual stress"). The residual stress $S_1$ (N/cm²) of the first pressure sensitive adhesive layer 21 is preferably 6 to 45, further preferably 10 to 40. The residual stress of the pressure sensitive adhesive is a stress (tensile stress) after elapse of 180 seconds after the pressure sensitive adhesive is deformed at a tension speed of 200 mm/minute by a tension tester until the strain reaches 300% (4 times as large as the original length). The residual stress correlates with the storage elastic modulus, and the residual stress tends to increase as the storage elastic modulus becomes larger. When the storage elastic modulus is unchanged, the viscosity of the pressure sensitive adhesive tends to decrease, leading to an increase in residual stress as the molecular weight of the base polymer increases, the ratio of monomers of branched structure in constituent monomers of the base polymer decreases (the ratio of linear monomers increases), and the gel fraction (crosslinking degree) increases.

[Second Pressure Sensitive Adhesive Layer]

The second pressure sensitive adhesive layer 22 is provided on second main surface of the optical film 10. In formation of the image display device, the second pressure sensitive adhesive is used for bonding the optical film 10 to the front transparent member 70 such as a front transparent plate or a touch panel. When an optical film with a pressure sensitive adhesive on both sides, in which the second pressure sensitive adhesive layer 22 for bonding the optical film to the front transparent member is provided on a surface opposite to the first pressure sensitive adhesive layer 21 to be used for bonding the optical film to the image display cell as described above, is used, it is not necessary to provide a liquid adhesive or an extra sheet pressure sensitive adhesive layer on the optical film 10 for interlayer filling. Therefore, the production process of the image display device can be simplified, and contamination due to protrusion of an adhesive (pressure sensitive adhesive) is prevented.

The thickness of the second pressure sensitive adhesive layer 22 is 50 µm or more. When the thickness of the second pressure sensitive adhesive layer is 50 µm or more, generation of bubbles in the vicinity of the printed portion 76 of the front transparent member 70, and display unevenness at the peripheral edge of the screen can be suppressed. The thickness of the second pressure sensitive adhesive layer 22 is more preferably 70 µm or more µm, further preferably 80 µm or more. The upper limit of the thickness of the second pressure sensitive adhesive layer 22 is not particularly limited, but is preferably 300 µm or less, further preferably 250 µm or less from the viewpoint of lightening/thinning of the image display device and in view of ease of forming the pressure sensitive adhesive layer, and handling characteristics.

The second pressure sensitive adhesive layer 22 has a residual stress $S_2$ (N/cm$^2$) of 0.5 to 6 as measured by a tensile stress relaxation test under the conditions of a temperature of 23° C., a strain of 300% and a relaxation time of 180 seconds. The residual stress $S_2$ (N/cm$^2$) of the second pressure sensitive adhesive layer 22 is preferably 0.7 to 5, more preferably 0.9 to 4, further preferably 1 to 3. When the residual stress $S_2$ (N/cm$^2$) of the second pressure sensitive adhesive layer 22 is 0.5 or more, protrusion of the pressure sensitive adhesive from the end surface of the film due to, for example, pressurization at the time of cutting where the optical film with a pressure sensitive adhesive is cut to a predetermined size, or at the time of bonding. When the second pressure sensitive adhesive layer 22 has a thickness of 50 µm or more and a residual stress $S_2$ (N/cm$^2$) of 6 or less, level difference absorbency can be imparted to the pressure sensitive adhesive to suppress generation of bubbles and occurrence of display unevenness in the vicinity of the printing level difference.

The storage elastic modulus of the second pressure sensitive adhesive layer 22 at a temperature of 23° C. is preferably 0.04 MPa to 0.4 MPa, more preferably 0.06 MPa to 0.2 MPa. When the storage elastic modulus of the second pressure sensitive adhesive layer falls within the above-mentioned range, moderate adhesiveness is exhibited, and the residual stress $S_2$ can be made to fall within the aforementioned range.

[Protective Sheet]

Protective sheets 31 and 32 are releasably attached to the first pressure sensitive adhesive layer 21 and the second pressure sensitive adhesive layer 22, respectively. The protective sheets 31 and 32 are used for the purpose of protecting the exposed surfaces of the pressure sensitive adhesive layers 21 and 22 until an optical film is put into practical use, and bonded to the image display cell 61 and the front transparent member 70. Further, in the present invention, the thickness of the protective sheet falls within a specific range, and thus curl of the optical film can be suppressed.

As the protective sheets 31 and 32, plastic films are preferably used. Preferably, the protective sheet has a tensile elastic modulus of about 1 GPa to 6 GPa at 23° C. When the tensile elastic modulus falls within the above-mentioned range, both sufficient mechanical strength for protecting the surface of the pressure sensitive adhesive and moderate flexibility are achieved. In the present invention, it is preferred that the tensile elastic modulus of the protective sheet falls within the above-mentioned range for suppressing curl of the optical film with a pressure sensitive adhesive on both sides.

Examples of the constituent material of each of the protective sheets 31 and 32 include polyolefins such as polyethylene, polypropylene and polymethylpentene, polyesters such as polyethylene terephthalate, polybutylene terephthalate and polyethylene naphthalate. Among them, polyester films, the mechanical strength of which is increased by biaxial stretching, are preferable, and as the protective sheets 31 and 32, biaxially stretched polyethylene terephthalate films are preferably used because they are excellent in mechanical strength and handling characteristics, and inexpensive. For improving releasability from the pressure sensitive adhesive layer in practical use, protective sheet whose adhesion surface to be faced to the pressure sensitive adhesive layer is subjected to a release treatment with silicone, long-chain alkyl, fluorine or the like is preferably used.

The thickness Y of the first protective sheet 31 that is temporarily attached on the first pressure sensitive adhesive layer 21 is 20 µm or more. When the thickness of the first protective sheet 31 is 20 µm or more, an excellent protection property for the pressure sensitive adhesive layer is exhibited, and curl of the film with a pressure sensitive adhesive on both sides can be suppressed by the bearing force of the protective sheet. For suppressing curl of the optical film with a pressure sensitive adhesive on both sides, the thickness of the first protective sheet 31 is preferably as large as possible. On the other hand, when the thickness of the first protective sheet 31 increases, it may become difficult to selectively peel the protective sheet 31 on the first pressure sensitive adhesive layer 21 at the time of bonding the optical film and the image display cell to each other. Thus, in view of ease of work of bonding the optical film to an image display cell, the thickness of the first protective sheet 31 is preferably 80 µm or less, more preferably 60 µm or less, further preferably 42 µm or less.

In the case where the optical film is first bonded to the image display cell and thereafter bonded to the front transparent member in formation of an image display device, it is necessary to peel the first protective sheet 31 on the first pressure sensitive adhesive layer 21 while the second protective sheet 32 remains attached on the second pressure sensitive adhesive layer 22. Even in this case, only the first protective sheet can be selectively peeled by reducing the thickness of the first protective sheet 31. From a similar point of view, the thickness Y of the first protective sheet 31 is preferably smaller than the thickness Z of the second protective sheet 32.

The thickness Z of the second protective sheet 32 that is temporarily attached on the second pressure sensitive adhesive layer 22 is 45 μm or more. Since the second pressure sensitive adhesive layer 22 is softer and has higher fluidity as compared to the first pressure sensitive adhesive layer 21, it is preferable to increase the thickness of the protective sheet for preventing deformation of the surface of the pressure sensitive adhesive layer. For protecting the second pressure sensitive adhesive layer and suppressing curl of the optical film with a pressure sensitive adhesive on both sides, the thickness of the second protective sheet is preferably as large as possible. On the other hand, an excessive increase in thickness of the second protective layer causes deterioration of handling characteristics and an increase in costs. Thus, the thickness Z of the second protective sheet 32 is preferably 130 μm or less.

As described above, when exposed to a high-humidity environment with the protective sheet temporarily attached on the pressure sensitive adhesive layer, the film with a pressure sensitive adhesive on both sides is easily curled such that a surface to be bonded to the front transparent member (surface on the pressure sensitive adhesive layer 222 side) is convexed as schematically shown in FIGS. 3B2. On the other hand, in the present invention, the thickness Y of the first protective sheet and the thickness Z of the second protective sheet each fall within a specific range, and thus occurrence of curl can be suppressed.

In the optical film with a pressure sensitive adhesive on both sides 50 according to the present invention, it is preferred that the residual stress $S_2$ (N/cm$^2$) of the second pressure sensitive adhesive layer 22, the thickness Y (μm) of the first protective sheet 31 and the thickness Z (μm) of the second protective sheet 32 satisfy the requirement of $Y+0.17Z+10.6S_2 \geq 63$. When the value of $Y+0.17Z+10.6S_2$ is 63 or more, occurrence of curl can be suppressed even if the optical film with a pressure sensitive adhesive on both sides is exposed to a high-humidity environment to absorb moisture. For further reducing the amount of curl, the value of $Y+0.17Z+10.6S_2$ is preferably 70 or more, more preferably 75 or more. The amount of curl tends to decrease as the value of $Y+0.17Z+10.6S_2$ increases. On the other hand, since the values of $S_2$, Y and Z each have an upper limit as described above, the upper limit value of $Y+0.17Z+10.6S_2$ is naturally defined.

In the present invention, curl of the optical film with a pressure sensitive adhesive on both sides can be suppressed by increasing the residual stress $S_2$ of the second pressure sensitive adhesive layer 22 and the thicknesses Y and Z of the protective sheets 31 and 32 as described above. For imparting level difference absorbency to the second pressure sensitive adhesive layer 22 and suppressing protrusion of the pressure sensitive adhesive from the end surface, the residual stress $S_2$ of the second pressure sensitive adhesive layer is set to fall within a specific range. The characteristics of the pressure sensitive adhesive are defined by characteristics required for an image display device, specifications and so on, and are therefore difficult to change. On the other hand, the protective sheet is a processing material that is not included in a final product, and films different in thickness can be easily obtained. Thus, it is preferable to suppress curl by adjusting the thicknesses Y and Z of the protective sheets 31 and 32 based on the formula described above.

<Probable Mechanism for Suppression of Curl>

As described later using examples (preparation example of optical film with pressure sensitive adhesive on both sides), the relational formula of $S_2$, Y and Z for suppression of curl is experimentally derived. Although the mechanism of suppression of curl by setting values of $S_2$, Y and Z to satisfy a specific relation is not clear, the followings may be estimated.

Occurrence of curl in the film with a pressure sensitive adhesive on both sides is ascribable to imbalance between stresses on both sides at the time when the optical film causes a dimensional change due to hygroscopic expansion etc. In an optical film with a pressure sensitive adhesive on one side 250 as shown in FIG. 3A, one surface of an optical film 210 is provided with a pressure sensitive adhesive layer 221 to be used for bonding the optical film to an image display cell, and a protective sheet 231 is provided thereon. The other surface of the optical film 210 is provided with a separator 232 with a weak pressure sensitive adhesive layer 229 provided on a surface thereof.

As described above, the polarizing plate contains a material having high water absorbency, such as a polyvinyl alcohol-based film or a cellulose-based film, and therefore expands when exposed to a high-humidity environment. Accordingly, an optical film including a polarizing plate more significantly causes dimensional change under a high-humidity environment as compared to a protective sheet formed of polyethylene terephthalate, etc. Expansion of the film 210 causes tensile stress at the interface between the film 210 and the pressure sensitive adhesive layer 221 and the interface between the film 210 and the pressure sensitive adhesive layer 229. When the pressure sensitive adhesive has low fluidity and a high storage elastic modulus, tensile stress at the interfaces between the pressure sensitive adhesive layers 221 and 229 and the optical film 210 is propagated to the interfaces between the pressure sensitive adhesive layers 221 and 229 and the protective sheets 231 and 232. The protective sheets 231 and 232 that have received tensile stress at the interfaces between the protective sheets and the pressure sensitive adhesive layers 221 and 229 exert compressive stress on the pressure sensitive adhesive layers 221 and 229 as a reactive force to the tensile stress. The compressive stress is propagated to the interfaces between the pressure sensitive adhesive layers 221 and 229 and the film 210 through the pressure sensitive adhesive layers 221 and 229.

The pressure sensitive adhesive layer 221 and the weak pressure sensitive adhesive layer 229 each have a small thickness and low fluidity, so that stress is hardly relaxed. Accordingly, on each of both sides of the optical film 210, tensile stress resulting from expansion of the optical film 210 and the reactive force (compressive stress) from the protective sheets 231 and 232 are balanced at the interface between the optical film and the pressure sensitive adhesive layer, so that curl hardly occurs.

In an optical film with a pressure sensitive adhesive on both sides 350 as shown in FIG. 3B1, one surface of an optical film 310 is provided with a hard pressure sensitive adhesive layer 321 for bonding the optical film to an image display cell. Accordingly, on a surface of the optical film on the pressure sensitive adhesive layer 321 side, tensile stress resulting from expansion of the optical film 310 and compressive stress from the protective sheet 331 are balanced as in the case of the optical film with a pressure sensitive adhesive on one side in FIG. 3A.

On the other hand, the other surface (surface on the viewing side in formation of an image display device) of the optical film 310 is provided with a pressure sensitive adhesive layer 322 which has a large thickness and small residual stress (i.e. which is soft, so that stress is easily relaxed) for bonding (interlayer filling) the optical film and the front transparent member. Since the pressure sensitive adhesive layer 322 is designed so as to easily relax stress for the purpose of imparting level difference absorbency, tensile stress at the interface between the optical film 310 and the pressure sensitive adhesive layer 322 is relaxed (attenuated) when propagated to the protective sheet 332. The reactive force (compressive stress) to the tensile stress is also relaxed in the pressure sensitive adhesive layer 232, and propagated to the interface between the pressure sensitive adhesive layer 322 and the optical film 310, and therefore tensile stress resulting from expansion of the optical film 310 is greater than compressive stress from the protective sheet 332.

When imbalance of stress occurs on both sides of the optical film 310 as described above, the optical film with a pressure sensitive adhesive on both sides 350 is curled such that a surface on the pressure sensitive adhesive layer 322 side is convexed as shown in FIG. 3B2. As the residual stress S of the pressure sensitive adhesive layer 322 decreases, curl tends to increase because stress is easily relaxed. It is considered that as the thickness of the protective sheet decreases, the reactive force from the protective sheet (bearing force from the protective sheet) to tensile stress resulting from hygroscopic expansion of the optical film, and the bending moment decreases, so that curl easily occurs.

On the other hand, it is considered that in the optical film with a pressure sensitive adhesive on both sides according to the present invention, the thickness Z of the second protective sheet is increased in accordance with the residual stress $S_2$ of the second pressure sensitive adhesive layer, and thus a reactive force capable of resisting tensile stress associated with a dimensional change of the optical film 10 is exerted, so that curl can be suppressed. It is considered that since the first protective sheet 31 is integrated with the optical film 10 with the first pressure sensitive adhesive layer 21 interposed therebetween, the first pressure sensitive adhesive layer 21 being thinner and harder as compared to the second pressure sensitive adhesive layer, and thus when the thickness Y of the first protective sheet 31 is large, the bending rigidity of the whole of the optical film with a pressure sensitive adhesive on both sides is increased, the curl suppressing effect obtained by increasing the thickness Y is greater than that obtained by increasing the thickness Z.

[Composition of Pressure Sensitive Adhesive]

The first pressure sensitive adhesive layer 21 and the second pressure sensitive adhesive layer 22 are not particularly limited with regard to the composition of the pressure sensitive adhesive as long as they have the above-mentioned characteristics. For the first pressure sensitive adhesive layer, various kinds of pressure sensitive adhesives that are used for bonding the optical film and the image display cell to each other can be used. As the pressure sensitive adhesive that forms the first pressure sensitive adhesive layer, an acryl-based pressure sensitive adhesive is preferably used.

As the pressure sensitive adhesive that forms the second pressure sensitive adhesive layer 22, one containing as a base polymer an acryl-based polymer, a silicone-based polymer, a polyester, a polyurethane, a polyamide, a polyvinyl ether, a vinyl acetate/vinyl chloride copolymer, a modified polyolefin, an epoxy-based polymer, a fluorine-based polymer, or a polymer based on a rubber such as a natural rubber or a synthetic rubber can be appropriately selected and used.

As a pressure sensitive adhesive excellent in optical transparency and adhesiveness, an acryl-based pressure sensitive adhesive containing an acryl-based polymer as a base polymer is preferably used. In the acryl-based pressure sensitive adhesive, the content of the acryl-based base polymer based on the total amount of solid components in the pressure sensitive adhesive composition is preferably 50% by weight or more, more preferably 70% by weight or more, further preferably 80% by weight or more.

As the acryl-based polymer, one having a monomer unit of a (meth)acrylic acid alkyl ester as a main skeleton is suitably used. In this specification, the "(math)acryl" means acryl and/or methacryl.

As the (meth)acrylic acid alkyl ester, a (meth)acrylic acid alkyl ester with the alkyl group having 1 to 20 carbon atoms is preferably used. The content of the (meth)acrylic acid alkyl ester is preferably 40% by weight or more, more preferably 50% by weight or more, further preferably 60% by weight or more based on the total amount of monomer components that form the base polymer. The acryl-based base polymer may be a copolymer of a plurality of (meth) acrylic acid alkyl esters. The arrangement of constituent monomer units may be random, or blockwise.

In the (meth)acrylic acid alkyl ester, the alkyl group may have a branch. By using a (meth)acrylic acid alkyl ester having a branch, flexibility can be imparted to the pressure sensitive adhesive to reduce residual stress. As the branched alkyl (meth)acrylic acid ester, 2-ethylhexyl (meth)acrylate, isooctyl (meth)acrylate, isononyl (meth)acrylate, isodecyl (meth)acrylate, isotetradecyl (meth)acrylate, isooctadecyl (meth)acrylate and so on are suitably used. Two or more branched alkyl (meth)acrylic acid esters may be used in combination. These branched (meth)acrylic acid alkyl esters may be used in combination with a linear (meth)acrylic acid ester.

The acryl-based base polymer preferably contains an acryl-based monomer unit having a crosslinkable functional group as a copolymer component. When the base polymer has a crosslinkable functional group, the gel fraction of the pressure sensitive adhesive can be easily increased by thermal crosslinking, photocuring or the like of the base polymer. Examples of the acryl-based monomer having a crosslinkable functional group include hydroxy group-containing monomers and carboxyl group-containing monomers. Particularly, it is preferred that a hydroxy group-containing monomer is contained as the copolymer component of the base polymer. When the base polymer has a hydroxy group-containing monomer as a monomer unit, the crosslinkability of the base polymer is improved, and cloudiness of the pressure sensitive adhesive under a high-temperature and high-humidity environment tends to be suppressed, so that a pressure sensitive adhesive having high transparency is obtained.

Examples of the hydroxy group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate and (4-hydroxymethylcyclohexyl)-methyl acrylate.

The content of the hydroxy group-containing monomer unit is preferably 0.01 to 30% by weight, more preferably 0.1 to 25% by weight, further preferably 0.5 to 20% by weight based on the total amount of constituent monomer units. When the content of the hydroxy group-containing monomer unit exceeds the above-mentioned range, the cohesive strength of the pressure sensitive adhesive layer excessively increases, and thus the residual stress $S_2$ exceeds the above-mentioned range, so that stress relaxation property may be deteriorated.

Preferably, the acryl-based base polymer contains, in addition to a hydroxy group-containing monomer unit, a monomer unit having high polarity, such as a nitrogen-containing monomer. When the acryl-based base polymer contains a high-polarity monomer unit such as a nitrogen-containing monomer unit in addition to a hydroxy group-containing monomer unit, the pressure sensitive adhesive has high adhesiveness and retentive strength, and cloudiness under a high-temperature and high-humidity environment is suppressed.

Examples of the nitrogen containing monomer include vinyl-based monomer such as N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, (meth)acryloylmorpholine, N-vinylcarboxylic acid amides and N-vinylcaprolactam; cyano group containing monomer such as acrylonitrile and methacrylonitrile. Among them, N-vinylpyrrolidone and (meth)acryloylmorpholine are preferably used. When a nitrogen-containing monomer unit is contained in the pressure sensitive adhesive, the cohesive strength of the pressure sensitive adhesive is increased to improve adhesiveness of the pressure sensitive adhesive sheet to an adherend, and cloudiness of the pressure sensitive adhesive under a high-temperature and high-humidity environment can be suppressed. The content of the nitrogen-containing monomer unit is preferably 3 to 50% by weight, more preferably 5 to 40% by weight, further preferably 7 to 30% by weight based on the total amount of constituent monomer units.

Monomer components that form the acryl-based polymer may include a polyfunctional monomer component. When a polyfunctional monomer is contained as a copolymerizable monomer component, residual stress tends to be increased. Accordingly, by changing the type and content of the polyfunctional monomer component, the residual stress $S_2$ of the second pressure sensitive adhesive layer 22 can be adjusted to fall within a desired range. The polyfunctional monomer is a monomer having at least two polymerizable functional groups each having an unsaturated double bond, such as (meth)acryloyl groups or vinyl groups. The amount of the polyfunctional monomer varies depending on the molecular weight thereof, the number of functional groups, or the like, but it is preferably 3% by weight or less, more preferably 2% by weight or less, further preferably 1% by weight or less based on the total amount of monomer components that form the (meth)acryl-based polymer. When the amount of the polyfunctional monomer is more than 3% by weight, the residual stress of the pressure sensitive adhesive excessively increases, so that bubbles are easily generated in the vicinity of the level difference portion.

The acryl-based base polymer can be obtained by polymerizing the monomer components using known methods such as solution polymerization, UV polymerization, mass polymerization and emulsification polymerization. Solution polymerization methods or active energy ray polymerization (e.g., UV polymerization) is preferable from the viewpoint of transparency, water resistance, costs and so on. As a solvent for solution polymerization, ethyl acetate, toluene or the like is generally used.

In preparation of the acryl-based polymer, a polymerization initiator such as a photopolymerization initiator or a thermopolymerization initiator may be used depending on a type of polymerization reaction. The photopolymerization initiator is not particularly limited as long as it initiates photopolymerization, and for example, a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzyl-based photopolymerization initiator, a benzophenone-based photopolymerization initiator, a ketal-based photopolymerization initiator, a thioxanthone-based photopolymerization initiator, an acyl phosphine oxide-based photopolymerization initiator or the like can be used. As the thermopolymerization initiator, for example, an azo-based initiator, a peroxide-based initiator, a redox-based initiator obtained by combining a peroxide and a reducing agent (e.g., combination of a persulfate and sodium hydrogen sulfite, combination of a peroxide and sodium ascorbate, or the like) can be used.

For adjusting the molecular weight of the base polymer, a chain-transfer agent may be used. The chain-transfer agent can receive radicals from a growing polymer chain to stop extension of the polymer, and the chain-transfer agent having received the radicals can attack the monomer to start polymerization again. Accordingly, when a chain-transfer agent is used, an increase in molecular weight of the base polymer is inhibited without reducing the concentration of radicals in the reaction system, so that a pressure sensitive adhesive sheet having small residual stress can be obtained. As the chain-transfer agent, for example, a thiol such as α-thioglycerol, lauryl mercaptan, glycidyl mercaptan, mercaptoacetic acid, 2-mercaptoethanol, thioglycolic acid, 2-ethylhexyl thioglycollate or 2,3-dimercapto-1-propanol is suitably used.

When a polyfunctional monomer, in addition to a monofunctional monomer, is used as a monomer component that forms the acryl-based polymer, the monofunctional monomer may be first polymerized to form a prepolymer composition with a low polymerization degree (preliminary polymerization), followed by polymerizing the prepolymer with the polyfunctional monomer by adding the polyfunctional monomer to a syrup of the prepolymer composition (post-polymerization). By performing preliminary polymerization followed by post-polymerization of the prepolymer as described above, a diverging point derived from a polyfunctional monomer component can be uniformly introduced into a base polymer. A mixture of a prepolymer composition and a non-polymerized monomer component (pressure sensitive adhesive composition) may be applied onto a base material, and then subjected to post-polymerization on the base material to form a pressure sensitive adhesive sheet. The prepolymer composition has a low viscosity and is thus excellent in coatability, and therefore by using a method in which a pressure sensitive adhesive composition as a mixture of a prepolymer composition and a non-polymerized monomer is applied, and then subjected post-polymerization on a base material, the productivity of a pressure sensitive adhesive sheet is improved, and the thickness of the pressure sensitive adhesive sheet can be made uniform.

The prepolymer composition can be prepared by, for example, partially polymerizing (preliminarily polymerizing) a composition (referred to as a "prepolymer forming composition") obtained by mixing a monomer component (referred to as a "monomer component A") that forms an acryl-based base polymer, and a polymerization initiator. Among the aforementioned monomer components that form the acryl-based polymer, the monomer component A in the prepolymer forming composition is preferably a monofunctional monomer component such as a (meth)acrylic acid alkyl ester or a polar group-containing monomer. The monomer component A may contain not only a monofunctional monomer but also a polyfunctional monomer. For example, after a part of a polyfunctional monomer component as a raw material of a base polymer is included in a prepolymer forming composition, and a prepolymer is polymerized, the remaining part of the polyfunctional monomer component may be added and subjected to post-polymerization.

In addition to the monomer component A and a polymerization initiator, the prepolymer forming composition may contain a chain-transfer agent etc. as necessary. The method for polymerizing a prepolymer forming composition is not particularly limited, but polymerization by irradiation of an active ray such as UV light is preferable for adjusting the reaction time to ensure that the molecular weight (polymerization ratio) of the prepolymer falls within a desired range. The polymerization initiator and the chain-transfer agent to be used for preliminary polymerization are not particularly limited, and for example, the above-mentioned photopolymerization initiators and chain-transfer agents may be used.

The polymerization ratio of the prepolymer is not particularly limited, but it is preferably 3 to 50% by weight, more preferably 5 to 40% by weight for adjusting a viscosity of the prepolymer syrup suitable for application onto a base material. The polymerization ratio can be adjusted to fall within a desired range by adjusting the type and used amount of a photopolymerization initiator, the irradiation intensity/irradiation time of an active ray such as UV light, and so on. The polymerization ratio of the prepolymer is calculated in accordance with the following formula from weights before and after heating (drying) in heating of the prepolymer composition at 130° C. for 3 hours. When the preliminary polymerization is performed by solution polymerization, the amount of a solvent is subtracted from the total weight of the prepolymer composition, and with the obtained value as the weight before drying in the following formula, a polymerization ratio is calculated.

Polymerization ratio (%) of prepolymer composition=weight after drying/weight before drying×100

A monomer component (referred to as a "monomer component B") that forms an acryl-based base polymer, and a polymerization initiator, a chain-transfer agent, a silane coupling agent, a crosslinker and the like as necessary are mixed with the prepolymer composition to form a pressure sensitive adhesive composition. Preferably, the monomer component B contains a polyfunctional monomer. The monomer component B may contain a monofunctional monomer in addition to a polyfunctional monomer.

The photopolymerization initiator and the chain-transfer agent to be used for post-polymerization are not particularly limited, and for example, the above-mentioned photopolymerization initiators and chain-transfer agents may be used. When the polymerization initiator in preliminary polymerization is not deactivated and remains in the prepolymer composition, addition of the polymerization initiator for post-polymerization may be omitted.

The base polymer may have a crosslinked structure as necessary. The crosslinked structure is formed by, for example, adding a crosslinker after polymerization of the base polymer or after preliminary polymerization. As the crosslinker, a common cross linker can be used, such as an isocyanate-based crosslinker, an epoxy-based crosslinker, an oxazoline-based crosslinker, an aziridine-based crosslinker, a carbodiimide-based crosslinker or a metal chelate-based crosslinker.

The content of the crosslinker is normally 0 to 5 parts by weight, preferably 0 to 3 parts by weight based on 100 parts by weight of the acryl-based base polymer. When the content of the crosslinker is excessively high, the storage elastic modulus G' increases, and resultantly tan δ decreases, so that ingress of bubbles and display unevenness may occur. Accordingly, the content of the crosslinker is preferably 2 parts by weight or less, more preferably 1 part by weight or less based on 100 parts by weight of the acryl-based base polymer.

When the pressure sensitive adhesive composition includes a crosslinker, it is preferred to perform a heating for crosslinking to form crosslinked structure before bonding to an adherend. The heating temperature and the heating time in the crosslinking treatment are appropriately set according to a type of crosslinker to be used, and crosslinking is normally performed by heating at 20° C. to 160° C. for 1 minute to about 7 days.

For the purpose of adjusting the adhesive strength, a silane coupling agent can also be added in the pressure sensitive adhesive composition. The silane coupling agent may be used by one kind singly or two or more kinds in combination. When a silane coupling agent is added to the pressure sensitive adhesive composition, the addition amount thereof is normally about 0.01 to 5.0 parts by weight, preferably 0.03 to 2.0 parts by weight based on 100 parts by weight of the acryl-based base polymer.

The pressure sensitive adhesive composition may contain a tackifier as necessary. As the tackifier, for example, a terpene-based tackifier, a styrene-based tackifier, a phenol-based tackifier, a rosin-based tackifier, an epoxy-based tackifier, a dicyclopentadiene-based tackifier, a polyamide-based tackifier, a ketone-based tackifier, an elastomer-based tackifier or the like can be used.

In addition to the components exemplified above, additives such as a plasticizer, a softener, a degradation inhibitor, a filler, a colorant, an ultraviolet ray absorber, an antioxidant, a surfactant and an antistatic agent can be added in the pressure sensitive adhesive composition within the bounds of not impairing the characteristics of the pressure sensitive adhesive.

The second pressure sensitive adhesive layer 22 may be formed of a photocurable or thermosetting pressure sensitive adhesive. When a photocurable or thermosetting pressure sensitive adhesive is used for the second pressure sensitive adhesive layer 22, the storage elastic modulus and the residual stress can be increased by curing the second pressure sensitive adhesive layer 22 after bonding the optical film 10 and the front transparent member 70 to each other with the second pressure sensitive adhesive layer 22 interposed therebetween. Therefore, even when the image display device is exposed to a high-temperature environment, fluidization of the pressure sensitive adhesive is suppressed, so that generation of bubbles and peeling hardly occur. Thus long-term-reliable adhesiveness can be achieved. Particularly, a photocurable pressure sensitive adhesive is preferable because it is easily cured after the film is bonded to the front transparent member.

The photocurable pressure sensitive adhesive contains a photocurable component in addition to a base polymer. As the photocurable component, a radical-polymerizable compound (ethylenically unsaturated compound) having a carbon-carbon double bond (C=C bond) is preferably used. The radical-polymerizable compound may be present as a monomer or an oligomer in the pressure sensitive adhesive composition, or may be bonded to a functional group such as a hydroxy group of the base polymer. As the curable pressure sensitive adhesive, one containing a polymerization initiator (photopolymerization initiator or thermopolymerization initiator) is preferable.

When a radical-polymerizable compound is present as a monomer or an oligomer in the pressure sensitive adhesive composition, a polyfunctional polymerizable compound having two or more polymerizable functional groups per molecule is preferably used. Examples of the polyfunctional polymerizable compound include compounds having two or more C=C bonds per molecule, and compounds having one C=C bond, and a polymerizable functional group such as epoxy, aziridine, oxazoline, hydrazine or methylol. Among them, polyfunctional polymerizable compounds having two or more C=C bonds, like polyfunctional acrylates, are preferable.

By mixing with the base polymer a radical-polymerizable compound having a functional group capable of being chemically bonded to a functional group of the base polymer, and a radical-polymerizable functional group, the radical-polymerizable functional group can be introduced into the base polymer to form the pressure sensitive adhesive composition into a curable pressure sensitive adhesive. As the functional group capable of being chemically bonded to a functional group of the base polymer, an isocyanate group is preferable. The isocyanate group forms a urethane bond with a hydroxy group of the base polymer, so that a radical-polymerizable functional group can be easily introduced into the base polymer.

The method of photocuring is preferably a method in which a system containing a photocurable compound oligomer and a photopolymerization initiator is irradiated with an active ray such as an ultraviolet ray. A system using an ethylenically unsaturated compound and a photoradical generator is preferred because it has a high level of photosensitivity and can be selected from a wide range of materials. When the second pressure sensitive adhesive layer 22 is formed of a photocurable pressure sensitive adhesive, the content of the photocurable compound is preferably 2 to 50 parts by weight, more preferably 5 to 30 parts by weight based on 100 parts by weight of the whole pressure sensitive adhesive composition. When the content of the photocurable compound falls within the above-mentioned range, reliability of the adhesion after the curing can be improved while the residual stress before the curing remains low.

[Formation of Pressure Sensitive Adhesive Layer on Optical Film]

Examples of the method for forming the first pressure sensitive adhesive layer 21 and the second pressure sensitive adhesive layer 22 on the optical film 10 include a method in which the pressure sensitive adhesive composition is applied on a substrate such as a release treated separator and dried to remove a solvent etc., and subjected to a crosslinking treatment as necessary to form a pressure sensitive adhesive layer, and the pressure sensitive adhesive layer is then transferred onto the optical film 10; and a method in which the pressure sensitive adhesive composition is applied to the optical film 10, and dried to remove a solvent etc., so that a pressure sensitive adhesive layer is formed on the optical film. In the method in which a pressure sensitive adhesive layer is transferred onto an optical film, a separator used for formation of the pressure sensitive adhesive layer may be used as it is as a protective sheet. When a pressure sensitive adhesive composition is applied onto the optical film 10 to form a pressure sensitive adhesive layer, a protective sheet is provided on the pressure sensitive adhesive layer after a solvent is dried and removed.

Examples of the method for forming the pressure sensitive adhesive layer include roll coating, kiss roll coating, gravure coating, reverse coating, roll brushing, spray coating, dip roll coating, bar coating, knife coating, air knife coating, curtain coating, lip coating, and extrusion coating methods using a die coater etc. As a method for drying the applied pressure sensitive adhesive, a suitable method can be appropriately employed according to a purpose.

[Cutting]

The optical film with a pressure sensitive adhesive is put into practical use after being cut to a desired size as necessary. Generally, a long-shaped optical film with a pressure sensitive adhesive is cut to a product size consistent with a size of an image display device (screen size). Examples of the cutting method include a method of punching the film using a Thompson blade etc., a method using a cutter such as a circular shear or a plate blade, laser light or hydraulic pressure.

In the optical film with a pressure sensitive adhesive, the surfaces of the pressure sensitive adhesive layers are protected because the protective sheets 31 and 32 are attached on the surfaces of the pressure sensitive adhesive layers 21 and 22. On the other hand, the side surface of the pressure sensitive adhesive layer is exposed to the outside. Accordingly, the second pressure sensitive adhesive layer 22 is stuck to a cutting blade during cutting, and glue missing and glue contamination tend to easily occur. For preventing glue missing and glue contamination, the side surface of the pressure sensitive adhesive layer may be located inner side than the side surface of the optical film or the side surface of the protective sheet. The side surface of the pressure sensitive adhesive layer can be located inside the side surface of the optical film or the side surface of the protective sheet by, for example, a method in which the area of the pressure sensitive adhesive layer provided on the optical film is controlled, or a method in which after the pressure sensitive adhesive layer is provided, only the pressure sensitive adhesive layer portion is removed. Further, by a method in which the optical film with a pressure sensitive adhesive on both sides is pressurized from the surface provided with the protective sheet, so that the end of the pressure sensitive adhesive layer is protruded from the end of the optical film, and in this state, the pressure sensitive adhesive layer is cut, followed by releasing the pressure, the side surface of the pressure sensitive adhesive layer can be located inside the side surface of the optical film or the side surface of the protective sheet.

[Image Display Device]

The optical film with a pressure sensitive adhesive on both sides according to the present invention is suitably used for formation of the image display device 100 which includes the image display cell 61 such as a liquid crystal cell or an organic EL cell on one surface of the optical film 10 including a polarizing plate, and includes the front transparent member 70 such as a touch panel or a front transparent plate on the other surface (viewing side) as schematically shown in FIG. 2. In the image display device, the image display cell 61 is bonded to the optical film 10 with the first pressure sensitive adhesive layer 21 interposed therebetween, and the front transparent member 70 is bonded to the optical film 10 with the second pressure sensitive adhesive layer 22 interposed therebetween.

The front transparent member 70 is, for example, a front transparent plate (window layer) or a touch panel. As the front transparent plate, a transparent plate having appropriate mechanical strength and thickness. As this transparent plate, for example, a transparent resin plate such as that of an acryl-based resin or a polycarbonate-based resin, or a glass plate is used. As the touch panel, a touch panel of any type such as resistive film type, capacitance type, optical type or ultrasonic type is used.

As the optical film with a pressure sensitive adhesive on both sides 50, one cut to a product size consistent with an image display size in advance is suitably used in formation of the image display device. The method for bonding the image display cell 61 to the optical film with a pressure sensitive adhesive on both sides 55, and the method for bonding the front transparent member 70 to the optical film with a pressure sensitive adhesive on both sides 55 are not particularly limited, and bonding can be performed by various kinds of known methods after the protective sheets 31 and 32 attached on the surfaces of the first pressure sensitive adhesive layer 21 and the second pressure sensitive adhesive layer 22, respectively, are peeled off. Since the optical film with a pressure sensitive adhesive on both sides according to the present invention includes the first pressure sensitive adhesive layer and the second pressure sensitive adhesive layer, it is not necessary to provide an extra liquid adhesive or pressure sensitive adhesive sheet in a bonding step for forming an image display device. Therefore, the production process is simplified.

The order of bonding is not particularly limited, bonding of the image display cell 61 to the first pressure sensitive adhesive layer 21 of the optical film with a pressure sensitive adhesive on both sides 55 may precede, or bonding of the front transparent member 70 to the second pressure sensitive adhesive layer 22 of the optical film with a pressure sensitive adhesive on both sides 55 may precede. The former bonding and the latter bonding may be performed in parallel. For improving workability in bonding and axis precision of the optical film, it is preferred that a first bonding step of bonding the optical film 10 and the image display cell 61 to each other with the first pressure sensitive adhesive layer interposed therebetween after peeling off the protective sheet 31 from the surface of the first pressure sensitive adhesive layer 21 is performed, followed by a second bonding step of peeling off the protective sheet 32 from the surface of the second pressure sensitive adhesive layer 22, and bonding the optical film 10 and the front transparent member 70 to each other with the second pressure sensitive adhesive layer 22 interposed therebetween.

If curl occurs such that a surface on the viewing side (second pressure sensitive adhesive layer 22 side) is convexed when the optical film is first bonded to the image display cell 61, registration or alignment between the optical film and the image display cell becomes difficult, so that workability in bonding tends to be deteriorated. The optical film with a pressure sensitive adhesive on both sides according to the present invention is excellent in workability in bonding to the image display cell because occurrence of curl is suppressed.

It is preferred to perform degassing for removing bubbles at the interface between the second pressure sensitive adhesive layer 22 and the flat plate 71 portion of the front transparent member 70, and in the vicinity of a non-flat portion such as the printed portion 76 after the optical film and the front transparent member are bonded to each other. As a degassing method, an appropriate method such as heating, pressurization or pressure reduction can be employed. For example, it is preferred that bonding is performed while ingress of bubbles is suppressed under reduced pressure and heating, and pressurization is then performed in parallel with heating through autoclave or the like for the purpose of, for example, suppressing delay bubbles. In the present invention, the residual stress of the second pressure sensitive adhesive layer falls within a specific range, and therefore the second pressure sensitive adhesive layer easily follows the shape of a non-flat portion such as a level difference, so that generation of gaps is suppressed even when the front transparent member has a non-flat portion.

When degassing is performed by heating, the heating temperature is in a range of generally about 25° C. to 150° C., preferably 30° C. to 130° C., more preferably 35° C. to 120° C., further preferably 40° C. to 100° C. When pressurization is performed, the pressure is in a range of generally about 0.05 MPa to 2 MPa, preferably 0.1 MPa to 1.5 MPa, more preferably 0.2 MPa to 1 MPa.

When the pressure sensitive adhesive that forms the second pressure sensitive adhesive layer is a curable pressure sensitive adhesive, it is preferred that the second pressure sensitive adhesive layer is cured after the optical film 10 and the front transparent member 70 are bonded to each other. By curing the second pressure sensitive adhesive layer, reliability of adhesion between the optical film 10 and the front transparent member 70 in the image display device can be improved. When the heating or pressurization is performed for the purpose of removing bubbles and the like after the optical film and the front transparent member are bonded to each other, it is preferred that curing of the second pressure sensitive adhesive layer is performed after removal of bubbles. By performing curing of the second pressure sensitive adhesive layer after removal of bubbles, generation of delay bubbles is suppressed.

The method for curing the second pressure sensitive adhesive layer is not particularly limited. When photocuring is performed, a method is preferred in which an active ray such as an ultraviolet ray is applied through the front transparent member 70. When the front transparent member 70 has a non-transparent portion such as the printed portion 76, an active ray is not applied to immediately below the printed portion, but transfer of radicals generated in a portion irradiated with light causes the pressure sensitive adhesive proceeds to be cured to some degree in a portion which is not irradiated with light.

By using the optical film with a pressure sensitive adhesive on both sides, a bonding step can be simplified in production of an image display device employing an interlayer filling structure as described above. The optical film with a pressure sensitive adhesive on both sides according to the present invention is excellent in workability in bonding because occurrence of curl is suppressed, and protrusion of a pressure sensitive adhesive from the end surface is suppressed. Further, since the residual stress $S_2$ of the second pressure sensitive adhesive layer falls within a specific range, ingress of bubbles between the optical film and the front transparent plate or the touch panel can be suppressed to provide a high-quality image display device.

EXAMPLES

The present invention will be described more specifically below by showing preparation examples of optical film with a pressure sensitive adhesive on both sides, but the present invention is not limited to these examples.

<Polarizing Plate>

A polarizing plate (polarization degree: 99.995%) with a transparent protective film laminated on each of both surfaces of a polarizer formed of a 25 μm-thick stretched polyvinyl alcohol film impregnated with iodine was used. The transparent protective film on one surface (image display cell side) of the polarizer was a 40 μm-thick triacetyl cellulose film, and the transparent protective film on the other surface (viewing side) was a 60 μm-thick triacetyl cellulose film.

<Preparation of Cell-Side Bonding Pressure Sensitive Adhesive Composition>

97 parts by weight of butyl acrylate, 3 parts of acrylic acid, 0.2 part by weight of azobisisobutyronitrile as a polymerization initiator and 233 parts by weight of ethyl acetate were put into a separable flask provided with a thermometer, a stirrer, a reflux cooling tube and a nitrogen gas inlet, and a nitrogen gas was then fed to perform nitrogen purge for 1 hour while the mixture was stirred. Thereafter, the flask was heated to 60° C., the mixture was reacted for 7 hours to obtain an acryl-based polymer having a weight average molecular weight (Mw) of 1100000. A pressure sensitive adhesive composition (solution) was prepared by adding 0.8 part by weight of trimethylolpropane tolylene diisocyanate (trade name "CORONATE L", manufactured by Nippon Polyurethane Industry Co., Ltd.) as an isocyanate-based crosslinker and 0.1 part by weight of a silane coupling agent (trade name "KBM-403", manufactured by Shin-Etsu Chemical Co., Ltd.) to the acryl-based polymer solution (solid content was taken as 100 parts by weight).

<Preparation of Viewing-Side Bonding Pressure Sensitive Adhesive Compositions a to K>

40 parts by weight of isostearyl acrylate (ISA), 40 parts by weight of 2-ethylhexyl acrylate (2EHA), 19 parts by weight of N-vinylpyrrolidone (NVP) and 1 part by weight of 4-hydroxybutyl acrylate (4HBA) as monomer components, and 0.1 part by weight of 1-hydroxy-cyclohexyl-phenyl-ketone (trade name "IRGACURE 184", manufactured by BASF Japan Ltd.) as a photopolymerization initiator were put in a four-neck flask, and irradiated with an ultraviolet ray under a nitrogen atmosphere to obtain a prepolymer composition having a polymerization ratio of 10%. To this prepolymer, trimethylolpropane triacrylate (TMPTA) as a polyfunctional monomer, α-thioglycerol (TGR) as a chain-transfer agent and a silane coupling agent (trade name "KBM403" manufactured by Shin-Etsu Chemical Co., Ltd.) each in a blending amount as shown in Table 1 were added. These components were then uniformly mixed to prepare a pressure sensitive adhesive composition.

[Preparation Example of Optical Film with Pressure Sensitive Adhesive on Both Sides]

(Formation of Cell-Side Pressure Sensitive Adhesive Sheet)

The cell-side bonding pressure sensitive adhesive composition was applied on a release-treated surface of a separator (a polyethylene terephthalate-film with a surface subjected to a release treatment; thickness Y=25 µm, 38 µm or 50 µm) so as to have a thickness of 20 µm after drying, and dried at 100° C. for 3 minutes to remove the solvent. A release-treated surface of a light release separator was bonded to the surface of the pressure sensitive adhesive layer after drying, and heating was carried out at 50° C. for 48 hours to perform a crosslinking treatment, thereby preparing a cell-side pressure sensitive adhesive sheet.

The storage elastic modulus of the pressure sensitive adhesive sheet was $1.4 \times 10^5$ Pa. The storage elastic modulus was determined in the following manner: a plurality of pressure sensitive adhesive sheets, from which a separator was peeled off, were laminated to obtain a laminate having a thickness of about 1.5 mm, and with the obtained laminate as a measurement sample, a dynamic viscoelasticity was measured under the following conditions using "Advanced Rheometric Expansion System (ARES)" manufactured by Rheometric Scientific, Inc., and a storage elastic modulus at 23° C. was read from the measurement result.

(Measurement Conditions)
Deformation mode: torsion
Measurement Frequency: 1 Hz
Temperature elevation rate: 5° C./minute
Measurement temperature: −50 to 150° C.
Shape: parallel plate (8.0 mmφ)

(Formation of Viewing-Side Pressure Sensitive Adhesive Sheet)

A coating layer was formed on a release-treated surface of a separator (thickness Z=50 µm, 75 µm or 125 µm) by applying each of the pressure sensitive adhesives A to K so as to have a thickness of 150 µm, and a release-treated surface of a light release separator was bonded onto the coating layer. Thereafter, from above a surface on the light release separator side, UV irradiation was performed until the integrated light amount reached 3000 mJ/cm$^2$ using a black light regulated in position so that the irradiation intensity at the irradiation surface immediately below the lamp was 5 mW/cm$^2$, thereby advancing polymerization to prepare an acryl-based pressure sensitive adhesive sheet having a thickness of 150 µm.

Table 1 shows the compositions of pressure sensitive adhesives A to K and the residual stresses of pressure sensitive adhesive sheets. For measurement of residual stress, a sheet piece of 40 mm×40 mm was cut out from the pressure sensitive adhesive sheet, rounded in the form of a column, and used as a measurement sample. In a tension tester, the chuck-to-chuck distance was adjusted to 20 mm, the measurement sample was set, and stretched to a strain of 300% (chuck-to-chuck distance: 80 mm) at a tension speed of 200 mm/minute and a temperature of 23° C., and the stress (tensile stress) after elapse of 180 seconds with the chuck position being fixed was defined as a residual stress.

TABLE 1

| pressure sensitive adhesive | prepolymer composition | composition of pressure sensitive adhesive (wt part) | | | | residual stress $S_2$ (N/cm$^2$) |
| | | photo-polymerization initiator | silane coupling agent | poly-functional monomer | chain-transfer agent | |
|---|---|---|---|---|---|---|
| A | 2EHA/ISA/NVP/4HBA = 40/40/19/1 | 0.1 | 0.3 | 0.15 | 0.40 | 0.3 |
| B | | | | 0.15 | 0.25 | 0.5 |
| C | | | | 0.15 | 0.21 | 0.7 |
| D | | | | 0.15 | 0.18 | 0.9 |
| E | | | | 0.15 | 0.15 | 1.3 |
| F | | | | 0.15 | 0.12 | 1.7 |
| G | | | | 0.15 | 0.10 | 2.1 |
| H | | | | 0.15 | 0.08 | 2.5 |
| I | | | | 0.15 | 0.06 | 2.9 |
| J | | | | 0.02 | 0 | 6.0 |
| K | | | | 0.04 | 0 | 8.0 |

(Preparation of Optical Film with Pressure Sensitive Adhesive on Both Sides)

The light release separator was peeled off from the surface of each of the cell-side pressure sensitive adhesive sheet and the viewing-side pressure sensitive adhesive sheet, the cell-side pressure sensitive adhesive sheet was bonded to one surface of the polarizing plate, and the viewing-side pressure sensitive adhesive sheet was bonded to the other surface of the polarizing plate. An optical film with a pressure sensitive adhesive on both sides in each of samples No. 1 to 88 was prepared while the combination of the type (A to K) of the pressure sensitive adhesive of the viewing-side pressure sensitive adhesive sheet, the thickness (Y=25 µm, 38 µm, 50 µm) of the separator on the cell-side pressure sensitive adhesive sheet and the thickness (Z=50 µm, 75 µm, 125 µm) of the separator on the viewing-side pressure sensitive adhesive sheet was changed as shown in Table 2.

(Preparation of Pseudo-Panel for Evaluation>

The optical film with a pressure sensitive adhesive on both sides in each preparation example was cut to a size of 44 mm×84 mm, the separator on the cell-side pressure sensitive adhesive layer was peeled off, and the optical film was bonded to the central portion of a glass plate (0.7 mm×50 mm×100 mm). Thereafter, the separator on the surface of the viewing-side pressure sensitive adhesive layer of the optical film with a pressure sensitive adhesive on both sides, which was bonded to the glass plate, was peeled off, a glass plate (0.7 mm×50 mm×100 mm, the peripheral edge of which was printed with a black ink in the form of a frame (ink printing width: 10 mm from end; ink printing thickness: 15 µm), was bonded by a vacuum bonding apparatus (temperature: 25° C.; pressure: 0.3 MPa; pressure retention time: 5 seconds), and an autoclave treatment (50° C., 0.5 MPa, 15 minutes) was performed to prepare a pseudo-panel for evaluation.

[Evaluation]
(Measurement of Curl)

The optical film with a pressure sensitive adhesive on both sides in each preparation example was cut to a size of 70 mm×100 mm, placed in an environment test chamber at a temperature of 25° C. and a humidity of 98% for 48 hours, and then taken out from the test chamber. The film was left standing on a horizontal plane under an environment at a temperature of 25° C. and a humidity of 50% for 2 hours with a surface on the cell-side pressure sensitive adhesive sheet side facing upward, a height from the horizontal plane at each of the four corners of the film was then measured, and an average for the four points was defined as a curl of the film after absorption of moisture. In Table 2, samples with a curl of less than 2 mm are marked as "excellent", samples with a curl of 2 mm or more and less than 3 mm are marked as "good", samples with a curl of 3 mm or more and less than 5 mm are marked as "moderate", and samples with a curl of 5 mm or more are marked as "bad".

<Glue Protrusion>

A glue protrusion length from the end of the film with a pressure sensitive adhesive on both sides in the pseudo-panel for evaluation before placement of the panel in the oven was observed with a digital microscope at a magnification of 20. In Table 2, samples with a maximum protrusion length of not more than 0.3 mm are marked as "good", and samples with a maximum protrusion length of more than 0.3 mm are marked as "bad".

<Bubbles>

The vicinity of the inside of a black ink-printed portion in the pseudo-panel for evaluation prepared in each examples was observed with a digital microscope at a magnification of 20 to check presence/absence of bubbles in the pressure sensitive adhesive layer. In addition, after the pseudo-panel for evaluation was placed in an oven at 85° C. for 48 hours, presence/absence of bubbles was checked using a same method. In Table 2, samples with no bubbles observed either before or after heating are marked as "good", and samples with bubbles observed before or after heating are marked as "bad".

[Evaluation Results]

Table 2 shows the type and residual stress of the viewing-side pressure sensitive adhesive (PSA) used in each preparation example, the thickness of the protective sheet on each of the cell side and the viewing side, level difference absorbency, glue protrusion and results of evaluation of curl.

TABLE 2

| sample No. | PSA | $S_2$ | Y | Z | curl | glue protrusion | level difference absorbency |
|---|---|---|---|---|---|---|---|
| 1 | A | 0.3 | 25 | 50 | bad | bad | good |
| 2 | | | 25 | 75 | bad | bad | good |
| 3 | | | 25 | 125 | bad | bad | good |
| 4 | | | 38 | 50 | bad | bad | good |
| 5 | | | 38 | 75 | bad | bad | good |
| 6 | | | 38 | 125 | bad | bad | good |
| 7 | | | 50 | 50 | good | bad | good |
| 8 | | | 75 | 50 | good | bad | good |
| 9 | B | 0.5 | 25 | 50 | bad | good | good |
| 10 | | | 25 | 75 | bad | good | good |
| 11 | | | 25 | 125 | bad | good | good |
| 12 | | | 38 | 50 | bad | good | good |
| 13 | | | 38 | 75 | bad | good | good |
| 14 | | | 38 | 125 | good | good | good |
| 15 | | | 50 | 50 | good | good | good |
| 16 | | | 75 | 50 | excellent | good | good |
| 17 | C | 0.7 | 25 | 50 | bad | good | good |
| 18 | | | 25 | 75 | bad | good | good |
| 19 | | | 25 | 125 | bad | good | good |
| 20 | | | 38 | 50 | bad | good | good |
| 21 | | | 38 | 75 | moderate | good | good |
| 22 | | | 38 | 125 | good | good | good |
| 23 | | | 50 | 50 | good | good | good |
| 24 | | | 75 | 50 | excellent | good | good |
| 25 | D | 0.9 | 25 | 50 | bad | good | good |
| 26 | | | 25 | 75 | bad | good | good |
| 27 | | | 25 | 125 | moderate | good | good |
| 28 | | | 38 | 50 | moderate | good | good |
| 29 | | | 38 | 75 | moderate | good | good |
| 30 | | | 38 | 125 | good | good | good |
| 31 | | | 50 | 50 | good | good | good |
| 32 | | | 75 | 50 | excellent | good | good |
| 33 | E | 1.3 | 25 | 50 | bad | good | good |
| 34 | | | 25 | 75 | bad | good | good |
| 35 | | | 25 | 125 | moderate | good | good |
| 36 | | | 38 | 50 | moderate | good | good |
| 37 | | | 38 | 75 | good | good | good |
| 38 | | | 38 | 125 | excellent | good | good |
| 39 | | | 50 | 50 | excellent | good | good |
| 40 | | | 75 | 50 | excellent | good | good |
| 41 | F | 1.7 | 25 | 50 | bad | good | good |
| 42 | | | 25 | 75 | moderate | good | good |
| 43 | | | 25 | 125 | good | good | good |
| 44 | | | 38 | 50 | good | good | good |
| 45 | | | 38 | 75 | good | good | good |
| 46 | | | 38 | 125 | excellent | good | good |
| 47 | | | 50 | 50 | excellent | good | good |
| 48 | | | 75 | 50 | excellent | good | good |
| 49 | G | 2.1 | 25 | 50 | moderate | good | good |
| 50 | | | 25 | 75 | moderate | good | good |
| 51 | | | 25 | 125 | good | good | good |
| 52 | | | 38 | 50 | good | good | good |
| 53 | | | 38 | 75 | excellent | good | good |
| 54 | | | 38 | 125 | excellent | good | good |
| 55 | | | 50 | 50 | excellent | good | good |
| 56 | | | 75 | 50 | excellent | good | good |
| 57 | H | 2.5 | 25 | 50 | moderate | good | good |
| 58 | | | 25 | 75 | good | good | good |

TABLE 2-continued

| sample No. | PSA | $S_2$ | Y | Z | curl | glue protrusion | level difference absorbency |
|---|---|---|---|---|---|---|---|
| 59 | | | 25 | 125 | excellent | good | good |
| 60 | | | 38 | 50 | excellent | good | good |
| 61 | | | 38 | 75 | excellent | good | good |
| 62 | | | 38 | 125 | excellent | good | good |
| 63 | | | 50 | 50 | excellent | good | good |
| 64 | | | 75 | 50 | excellent | good | good |
| 65 | I | 2.9 | 25 | 50 | good | good | good |
| 66 | | | 25 | 75 | good | good | good |
| 67 | | | 25 | 125 | excellent | good | good |
| 68 | | | 38 | 50 | excellent | good | good |
| 69 | | | 38 | 75 | excellent | good | good |
| 70 | | | 38 | 125 | excellent | good | good |
| 71 | | | 50 | 50 | excellent | good | good |
| 72 | | | 75 | 50 | excellent | good | good |
| 73 | J | 6.0 | 25 | 50 | excellent | good | good |
| 74 | | | 25 | 75 | excellent | good | good |
| 75 | | | 25 | 125 | excellent | good | good |
| 76 | | | 38 | 50 | excellent | good | good |
| 77 | | | 38 | 75 | excellent | good | good |
| 78 | | | 38 | 125 | excellent | good | good |
| 79 | | | 50 | 50 | excellent | good | good |
| 80 | | | 75 | 50 | excellent | good | good |
| 81 | K | 8.0 | 25 | 50 | excellent | good | bad |
| 82 | | | 25 | 75 | excellent | good | bad |
| 83 | | | 25 | 125 | excellent | good | bad |
| 84 | | | 38 | 50 | excellent | good | bad |
| 85 | | | 38 | 75 | excellent | good | bad |
| 86 | | | 38 | 125 | excellent | good | bad |
| 87 | | | 50 | 50 | excellent | good | bad |
| 88 | | | 75 | 50 | excellent | good | bad |

From the results in Table 2, it is apparent that the pressure sensitive adhesive protrudes from the film end surface when the pressure sensitive adhesive A with the viewing-side pressure sensitive adhesive layer having a residual stress $S_2$ of 0.3 N/cm² is used as the viewing-side pressure sensitive adhesive layer. When the pressure sensitive adhesive K having a residual stress $S_2$ of 8.0 N/cm² is used as the viewing-side pressure sensitive adhesive layer, level difference absorbency is small, so that bubbles are generated in the vicinity of the printing level difference. Further, it is apparent that the curl after absorption of moisture decreases as the residual stress $S_2$ increases, and when the residual stress $S_2$ is unchanged, the curl after absorption of moisture decreases as one or both of the thickness Y of the cell-side separator and the thickness Z of the viewing-side separator is increased.

Figure 4A:
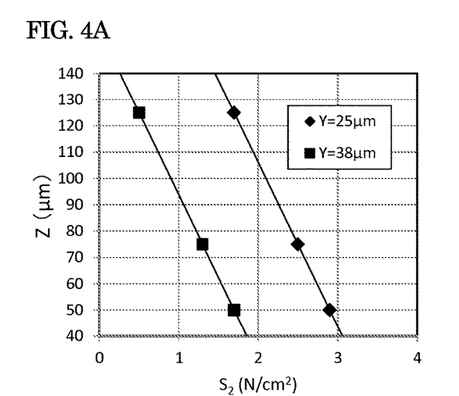
FIGS. 4A and 4B are graphs each showing a relationship between the residual stress $S_2$ of a pressure sensitive adhesive layer and the thickness of a protective sheet where the curl of an optical film with a pressure sensitive adhesive on both sides in a preparation example after absorption of moisture is 3 mm or less.
Figure 4B:
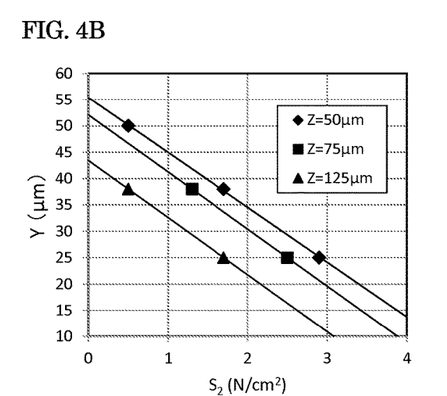

Tables 3A and 3B show excerpts of relationships between the residual stress $S_2$ of the viewing-side pressure sensitive adhesive layer, the thickness Y of the cell-side separator and the thickness Z of the viewing-side separator and the curl after absorption of moisture in Table 2. In Table 3A, the boundary between moderate (not less than 3 mm) and good (less than 3 mm) in evaluation of curl where the thickness Z of the viewing-side separator is changed while the thickness Y of the cell-side separator is fixed is surrounded by bold frames. In Table 3B, the boundary between moderate and good in evaluation of curl where the thickness Y of the cell-side separator is changed while the thickness Z of the viewing-side separator is fixed is surrounded by bold frames. FIGS. 4A and 4B show, respectively, plotted relationships between the residual stress $S_2$ of the viewing-side pressure sensitive adhesive layer and the thicknesses (Y or Z) of the separators, which correspond to these bold frames.

TABLE 3A

| Y (μm) | | 25 | | | 38 | | | 50 |
|---|---|---|---|---|---|---|---|---|
| Z (μm) | | 50 | 75 | 125 | 50 | 75 | 125 | 50 |
| $S_2$ (N/cm²) | 0.5 | bad | bad | bad | bad | bad | good | good |
| | 0.7 | bad | bad | bad | bad | moderate | good | good |
| | 0.9 | bad | bad | moderate | moderate | moderate | good | good |
| | 1.3 | bad | bad | moderate | moderate | good | excellent | excellent |
| | 1.7 | bad | moderate | good | good | good | excellent | excellent |
| | 2.1 | moderate | moderate | good | good | excellent | excellent | excellent |
| | 2.5 | moderate | good | excellent | excellent | excellent | excellent | excellent |
| | 2.9 | good | good | excellent | excellent | excellent | excellent | excellent |

TABLE 3B

| Z (μm) | | 50 | | | 75 | | 125 | |
|---|---|---|---|---|---|---|---|---|
| Y (μm) | | 25 | 38 | 50 | 25 | 38 | 25 | 38 |
| $S_2$ (N/cm²) | 0.5 | bad | bad | good | bad | bad | bad | good |
| | 0.7 | bad | bad | good | bad | moderate | bad | good |
| | 0.9 | bad | moderate | good | bad | moderate | moderate | good |
| | 1.3 | bad | moderate | excellent | bad | good | moderate | excellent |
| | 1.7 | bad | good | excellent | moderate | good | good | excellent |
| | 2.1 | moderate | good | excellent | moderate | excellent | good | excellent |
| | 2.5 | moderate | excellent | excellent | good | excellent | excellent | excellent |
| | 2.9 | good | excellent | excellent | good | excellent | excellent | excellent |

Regarding the curl suppressing effect, the residual stress $S_2$ and the thickness Z have a linear relationship in FIG. 4A, and the residual stress $S_2$ and the thickness Y have a linear relationship in FIG. 4B. The slopes of the two lines in FIG. 4A are almost the same, the slopes of the three lines in FIG. 4B are almost the same, and there is a correlation ratio of $S_2$:Y:Z=10.6:1:0.17. According to these results, it is apparent that curl in absorption of moisture by the optical film with a pressure sensitive adhesive on both sides can be suppressed by adjusting the thickness of the separator in accordance with the characteristics (residual stress) of a pressure sensitive adhesive to be used for bonding the front transparent member and the optical film to each other.

What is claimed is:

1. An optical film with a pressure sensitive adhesive on both sides, which is to be disposed between a front transparent plate or a touch panel and an image display cell, wherein
    the optical film with a pressure sensitive adhesive on both sides comprises: an optical film including a polarizing plate; a first pressure sensitive adhesive layer provided on first main surface of the optical film, which is to be bonded to an image display cell; and a second pressure sensitive adhesive layer provided on second main surface of the optical film, which is to be bonded to a transparent plate or a touch panel,
    a first protective sheet is releasably attached on the first pressure sensitive adhesive layer, and a second protective sheet is releasably attached on the second pressure sensitive adhesive layer,
    the first pressure sensitive adhesive layer has a thickness of 3 μm to 30 μm, and a storage elastic modulus of 0.02 MPa to 2 MPa at a temperature of 23° C., and
    the second pressure sensitive adhesive layer has a thickness of 50 μm or more, and
    where a residual stress of the second pressure sensitive adhesive layer is $S_2$ (N/cm$^2$);
    the thickness of the first protective sheet is Y (μm); and the thickness of the second protective sheet is Z (μm), the absolute values of $S_2$, Y and Z satisfy the following relationship:

$20 \leq Y \leq 80;$ $45 \leq Z;$ and $Y+0.17Z+10.6S_2 \geq 63,$ wherein the residual stress is a tensile stress as measured by a tensile stress relaxation test under conditions of a temperature of 23° C., a strain of 300%, and a relaxation time of 180 seconds.

2. The optical film with a pressure sensitive adhesive on both sides according to claim 1, wherein each of a tensile elastic modulus of the first protective sheet and a tensile elastic modulus of the second protective sheet is 1 GPa to 6 GPa.

3. The optical film with a pressure sensitive adhesive on both sides according to claim 1, wherein each of the first protective sheet and the second protective sheet is a biaxially stretched polyester film.

4. The optical film with a pressure sensitive adhesive on both sides according to claim 1, wherein the thickness Z of the second protective sheet is larger than the thickness Y of the first protective sheet.

5. The optical film with a pressure sensitive adhesive on both sides according to claim 1, wherein the second pressure sensitive adhesive layer contains a photocurable component.

6. A method for producing an image display device, comprising:
    providing an optical film with a pressure sensitive adhesive on both sides which comprises an optical film, a first pressure sensitive adhesive layer on first main surface of the optical film, a second pressure sensitive adhesive layer on second surface of the optical film, a first protective sheet releasably attached on the first pressure sensitive adhesive layer, and a second protective sheet releasably attached on the second pressure sensitive adhesive layer;
    a first bonding step of peeling off the first protective sheet attached on the first pressure sensitive adhesive layer, and then bonding a first main surface of the optical film and an image display cell to each other with the first pressure sensitive adhesive layer interposed therebetween; and
    a second bonding step of peeling off the second protective sheet attached on the second pressure sensitive adhesive layer, and then bonding a second surface side of the optical film and a front transparent plate or a touch panel to each other with the second pressure sensitive adhesive layer interposed therebetween, wherein
    the optical film includes a polarizing plate,
    the first pressure sensitive adhesive layer has a thickness of 3 μm to 30 μm, and a storage elastic modulus of 0.02 MPa to 2 MPa at a temperature of 23° C.,
    the second pressure sensitive adhesive layer has a thickness of 50 μm or more, and
    where a residual stress of the second pressure sensitive adhesive layer is $S_2$ (N/cm$^2$);
    the thickness of the first protective sheet is Y (μm); and the thickness of the second protective sheet is Z (μm), the absolute values of $S_2$, Y and Z satisfy the following relationship:

$20 \leq Y \leq 80;$ $45 \leq Z;$ and $Y+0.17Z+10.6S_2 \geq 63,$ wherein the residual stress is a tensile stress as measured by a tensile stress relaxation test under conditions of a temperature of 23° C., a strain of 300%, and a relaxation time of 180 seconds.

7. The method for producing an image display device according to claim 6, wherein
    the second pressure sensitive adhesive layer contains a photocurable component, and
    after the second bonding step, an active ray is applied from the front transparent plate or touch panel side to cure the second pressure sensitive adhesive layer.

8. A method for suppressing curl of an optical film with a pressure sensitive adhesive on both sides, wherein
    the optical film with a pressure sensitive adhesive on both sides is to be disposed between a front transparent plate or a touch panel and an image display cell, and comprises: an optical film including a polarizing plate; a first pressure sensitive adhesive layer provided on a surface of the optical film, which is to be bonded to an image display cell; and a second pressure sensitive adhesive layer provided on second surface of the optical film, which is to be bonded to a transparent plate or a touch panel,
    a first protective sheet is releasably attached on the first pressure sensitive adhesive layer, and a second protective sheet is releasably attached on the second pressure sensitive adhesive layer, the first pressure sensitive adhesive layer has a thickness of 3 μm to 30 μm, and a storage elastic modulus of 0.02 MPa to 2 MPa at a temperature of 23° C.,
the second pressure sensitive adhesive layer has a thickness of 50 μm or more, and
where a residual stress of the second pressure sensitive adhesive layer is $S_2$ (N/cm$^2$);
the thickness of the first protective sheet is Y (μm); and the thickness of the second protective sheet is Z (μm), $S_2$, Y and Z are set to satisfy the following relationship:

$$20 \leq Y \leq 80;$$

$$45 \leq Z; \text{ and}$$

$$Y + 0.17Z + 10.6S_2 \geq 63,$$

wherein the residual stress is a tensile stress as measured by a tensile stress relaxation test under conditions of a temperature of 23° C., a strain of 300%, and a relaxation time of 180 seconds.

* * * * *